(12) United States Patent
Tersmette et al.

(10) Patent No.: US 8,790,079 B2
(45) Date of Patent: Jul. 29, 2014

(54) RAM AIR TURBINE INLET

(75) Inventors: Trevor Andrew Tersmette, Cincinnati, OH (US); Christopher Allen Ryan, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 716 days.

(21) Appl. No.: 12/982,941

(22) Filed: Dec. 31, 2010

(65) Prior Publication Data

US 2012/0171016 A1    Jul. 5, 2012

(51) Int. Cl.
*B64D 41/00* (2006.01)
*B64D 33/02* (2006.01)

(52) U.S. Cl.
USPC ............... 415/218.1; 415/219.1; 415/220

(58) Field of Classification Search
USPC ............ 244/135 R, 135 A, 1 TD, 58, 53 B; 415/181, 222, 220, 219.1, 218.1
See application file for complete search history.

(56) References Cited

U.S. PATENT DOCUMENTS

| | | | |
|---|---|---|---|
| 3,075,742 A * | 1/1963 | Aldag | 415/146 |
| 4,692,093 A | 9/1987 | Safarik | |
| 4,770,368 A * | 9/1988 | Yates et al. | 244/1 TD |
| 5,249,924 A | 10/1993 | Brum | |
| 5,487,645 A * | 1/1996 | Eccles | 416/51 |
| 5,505,587 A * | 4/1996 | Ghetzler | 415/49 |
| 5,996,939 A * | 12/1999 | Higgs et al. | 244/135 A |
| 6,270,309 B1 | 8/2001 | Ghetzler et al. | |
| 2002/0122717 A1 | 9/2002 | Ghetzler et al. | |
| 2006/0137355 A1 | 6/2006 | Welch et al. | |
| 2007/0262203 A1* | 11/2007 | Saggio et al. | 244/135 A |
| 2010/0001124 A1 | 1/2010 | Feldmann | |
| 2010/0237196 A1 | 9/2010 | Saggio et al. | |

OTHER PUBLICATIONS

Day, Dwayne A. Aerial Refueling; http://www.centennialofflight.gov/essay/Evolution_of_Technology/refueling/Tech22.htm.
PCT Search Report and Written Opinion dated Jun. 22, 2012 from corresponding Application No. PCT/US2011/062213.

* cited by examiner

*Primary Examiner* — Edward Look
*Assistant Examiner* — Christopher J Hargitt
(74) *Attorney, Agent, or Firm* — Global Patent Operation; Mark A. Conklin

(57) ABSTRACT

An inlet for a ram air turbine. The inlet is positioned forward of a turbine shaft, which is configured to rotate about a portion of an object. The inlet has a fixed geometry that chokes airflow through the inlet to prevent overspeed of the turbine shaft.

15 Claims, 5 Drawing Sheets

RAM AIR TURBINE INLET

CROSS-REFERENCE TO RELATED APPLICATIONS

Not Applicable

STATEMENT REGARDING FEDERALLY SPONSORED RESEARCH OR DEVELOPMENT

Not Applicable

NAMES OF PARTIES TO A JOINT RESEARCH AGREEMENT

Not Applicable

REFERENCE TO A SEQUENCE LISTING, A TABLE, OR COMPUTER PROGRAM LISTING APPENDIX SUBMITTED ON COMPACT DISC

Not Applicable

BACKGROUND OF THE INVENTION

1. Field of the Invention

The field of the invention relates to aerial refueling systems generally, and more particularly to certain new and useful advances in Ram Air Turbines ("RAT"), of which the following is a specification, reference being had to the drawings accompanying and forming a part of the same.

2. Description of Related Art

A Ram Air Turbine (RAT) is a small turbine installed in a vehicle to generate electrical power from an airstream created as the vehicle moves through the atmosphere. Typically the vehicle is an aircraft, though RATs have also been used in other types of airborne devices. Some RATs use two-bladed or four-bladed propellers. Other RATs use ducted multi-blade fans. Some low drag ducted RATs slidably enclose a centerbody/valve tube having an aerodynamically shaped nose within a fairing. The tube and nose are movable between positions where the inlet is open as wide as possible or completely closed. Because such a RAT will be deployed directly into the airstream flowing past the host vehicle, its aerodynamically shaped nose is a continuous solid surface from endpoint to the walls of the tube. More importantly, during operation, such a RAT maintains optimum airflow to the turbine blades by moving the tube and nose relative to the fairing. Though this approach is useful, it uses multiple moving parts, which tend to be costly and to require maintenance and/or repair.

Large-extent flight envelopes for RATs can sometimes result in overspeed conditions, where the turbine begins to spin too quickly. If the overspeed condition is not checked, excessive centrifugal forces may damage the turbomachinery—by throwing it off balance and/or by causing the fan blades to crack. Current solutions for mitigating overspeed conditions typically involve variable turbine geometry, as described above, or mechanical braking mechanisms. Either solution is complex and costly.

BRIEF SUMMARY OF THE INVENTION

The present disclosure describes embodiments of a Ram Air Turbine ("RAT") inlet that meets power requirements at low airspeeds and limits airflow at high airspeeds to prevent overspeed conditions. In a departure from traditional approaches, embodiments of the RAT inlet do not use a slidable centerbody/valve tube. Instead, embodiments of the RAT inlet rely on a unique inlet that has a fixed geometry that, during flight, chokes airflow through the inlet to prevent overspeed of a turbine shaft. Consequently, the dimensions and geometry of embodiments of the RAT inlet herein described and claimed are fixed, not variable. In other words, embodiments of the RAT inlet itself have no moving parts. This results in a lighter, cheaper, simpler and more durable ram air turbine, which is configured to couple with an object that can be towed in flight. Non-limiting examples of such an object are a fuel hose, a fuel boom, a support member, an aircraft pod, a piece of aircraft ordnance, and so forth.

Other features and advantages of the disclosure will become apparent by reference to the following description taken in connection with the accompanying drawings.

BRIEF DESCRIPTION OF THE SEVERAL VIEWS OF THE DRAWINGS

Reference is now made briefly to the accompanying drawings, in which.

Like reference characters designate identical or corresponding components and units throughout the several views, which are not to scale unless otherwise indicated.

DETAILED DESCRIPTION OF THE INVENTION

An inlet for a ram air turbine ("RAT") is disclosed. The inlet is positioned forward of a turbine shaft, which is configured to rotate about a portion of an object. The object may extend through the ram air turbine partially or completely. Non-limiting examples of such an object are a fuel hose (such as an aircraft refueling hose), a fuel boom (such as a rigid, hollow, steerable fuel boom for refueling aircraft), a support member, an aircraft pod (wing-mounted or belly-mounted), a piece of aircraft ordnance, and so forth. The inlet has a fixed geometry that chokes airflow through the inlet to prevent overspeed of the turbine shaft. The inlet has a first member that surrounds a second member.

In one embodiment, a first end of the second member of the ram air turbine is open. In another embodiment, the first end of the second member is closed to form a nose cone. The nose cone may be employed where an embodiment of the ram air turbine will be coupled with a support member that is, or can be, extended from an aircraft. Embodiments of the ram air turbine can be coupled, with or without a nose cone, with a portion of a support member, an aircraft pod, or a portion of a piece of ordnance.

Figure 1:
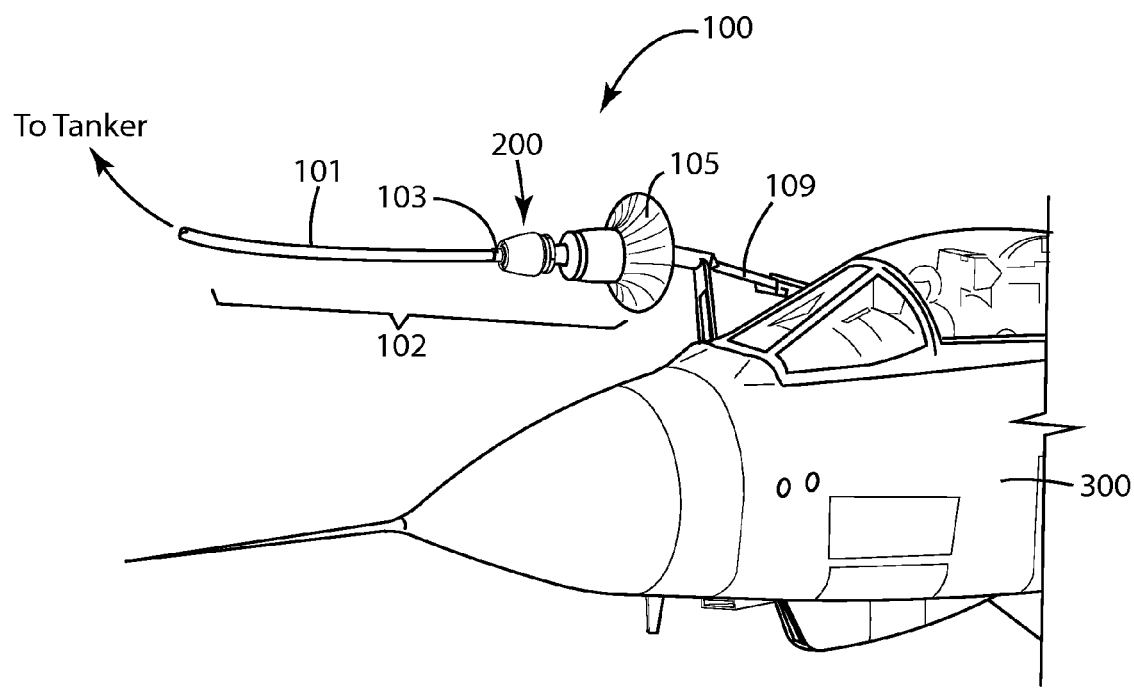
FIG. 1 is a perspective view of an embodiment of a ram air turbine ("RAT"), which is configured to couple with an object.

FIG. 1 is a perspective view of an embodiment of a ram air turbine ("RAT") 200, which is configured to couple with an object 100. In this particular, non-limiting illustration, the object 100 is an aerial refueling apparatus 102 having: a fuel hose 101, a fuel coupling 103, and a drogue basket 105. In this example, the ram air turbine 200 is shown encircling and coupled with an exterior surface of the fuel hose 101, between the fuel coupling 103 and the drogue basket 105. However, in other embodiments, the ram air turbine 200 can be coupled with any suitable portion of the object 100 and/or coupled with any suitable component of the object 100. The aircraft 300 is equipped with a refueling probe 109, which is inserted into the drogue basket 105. Although aircraft 300 is illustratively depicted as a fixed-wing aircraft, embodiments of the ram air turbine 200 can also be used with other types of aircraft, such as helicopters.

In operation, the object 100, in this example, a fuel hose 101, is deployed from a first aircraft (not shown). Thereafter, aircraft 300 approaches and connects with the object 100 to receive fuel, electrical power, data, etc. In this particular example, the refueling probe 109 of the aircraft 300 couples with the drogue basket 105 so that fuel can be transferred from the first aircraft (not shown) to aircraft 300. The ram air turbine 200 generates electrical power for one or more components of the object 100 and/or one or more components of the aircraft 300. Non-exhaustive examples of components of the object 100 are: a drogue steering mechanism, a fuel valve, an accelerometer, a gyroscope, a motor, a computer processor, a controller, a sensor, a transponder, a radiation emitter, and the like. Non-exhaustive examples of components of the aircraft 300 are communication systems, control systems, lighting and the like.

Figure 2:
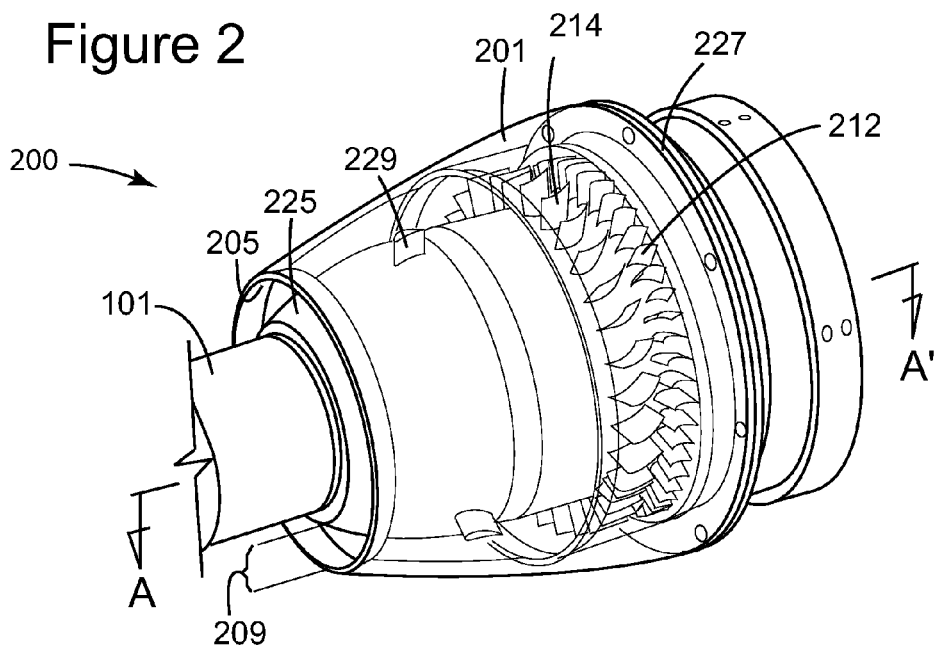
FIG. 2 is an exterior perspective view of the ram air turbine of FIG. 1, with a portion of the fairing made transparent for ease of illustration to show various components within it.
Figure 3:
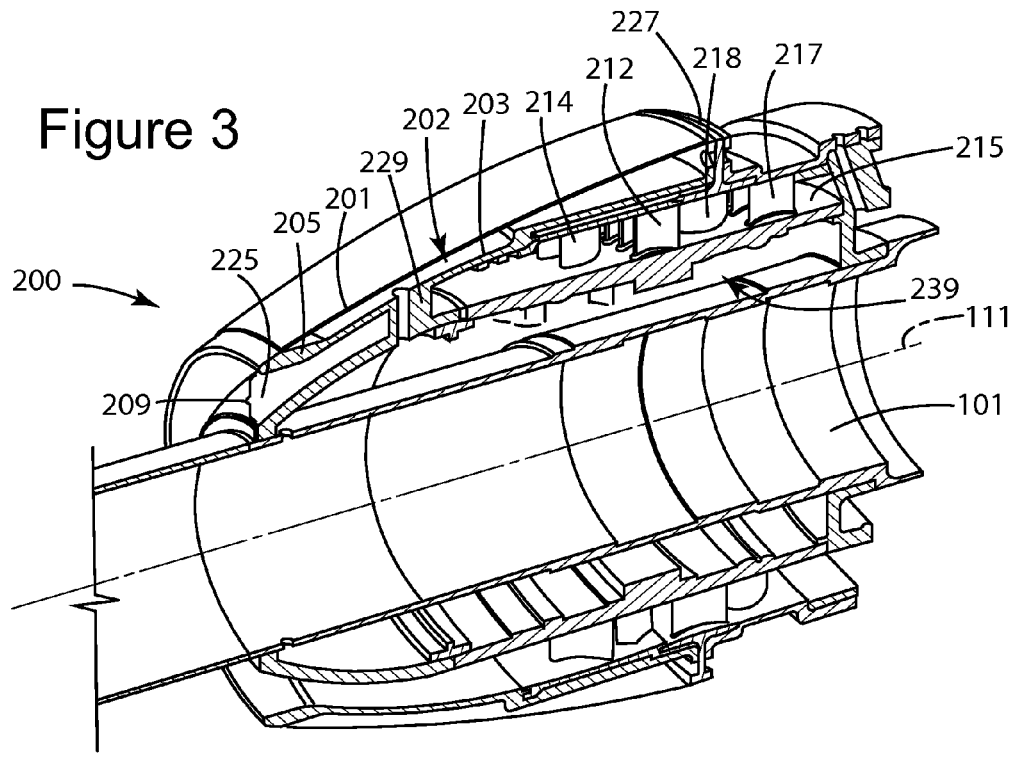
FIG. 3 is a cross-sectional perspective view of the ram air turbine of FIG. 2, taken along the line A-A'.
Figure 4:
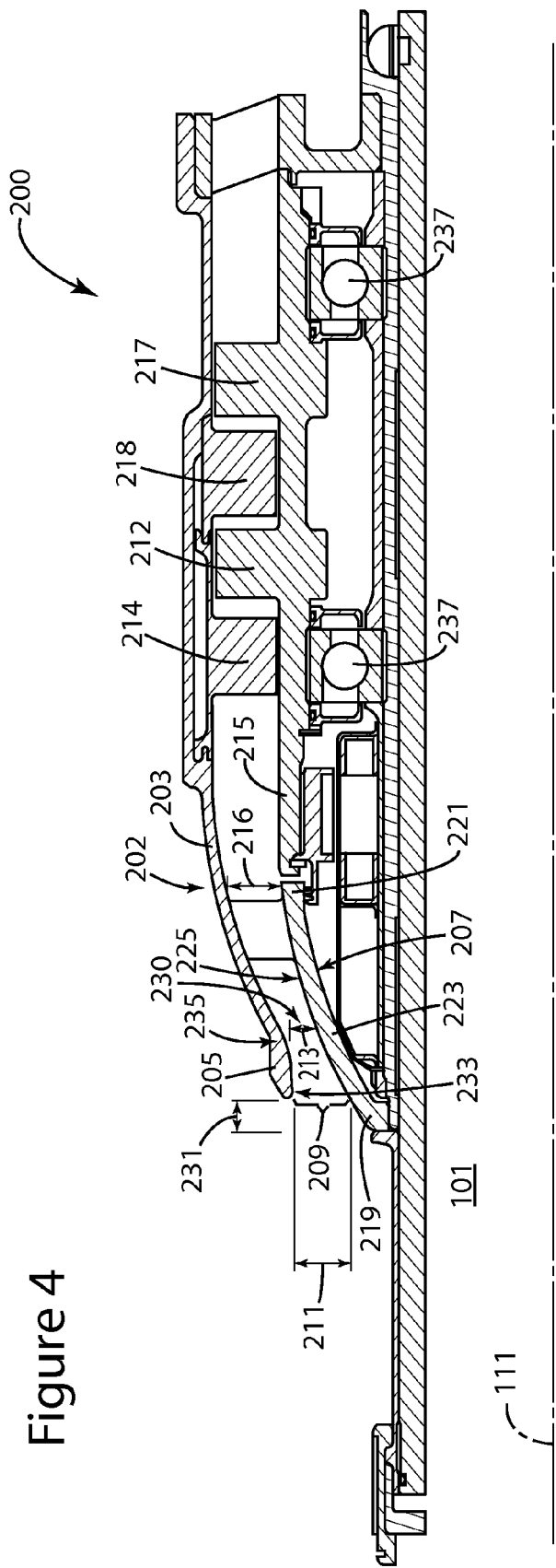
FIG. 4 is a cross-sectional view of one-half of the ram air turbine of FIG. 2, taken along the line A-A'.

FIG. 2 is an exterior perspective view of the ram air turbine 200 of FIG. 1, with a portion of the fairing 201 made transparent for ease of illustration to show various components within it. FIG. 3 is a cross-sectional perspective view of the ram air turbine 200 of FIG. 2, taken along the line A-A'. FIG. 4 is a cross-sectional view of one-half of the ram air turbine 200 of FIG. 2, taken along the line A-A'.

Referring now to FIGS. 2, 3, and 4, an embodiment of the ram air turbine 200 comprises a first member 202 and a second member 207. The first member 202 supports, and/or is coupled with, an aerodynamically shaped fairing 201 (hereinafter "fairing 201". A center portion of the first end 219 of the second member 207 is open, to permit the object 100 to extend through the ram air turbine 200. The second member 207 has a flow surface 225 extending from the first end 219 along a curved portion 223 to an opposite second end 221, which is within the fairing 201 and the first member 202. The second end 221 of the second member 207 is adjacent a first end of the turbine shaft 215. One or more fasteners 237 (FIG. 4) couple the second member 207 to a portion of the object 100, in this case a fuel hose 101. Alternatively, (with reference to FIGS. 2, 3, 4 and 6), the center portion of the first end 219 of the second member 207 is enclosed to form a nose cone 425.

A center portion of the second member 207 has a central cavity 239 configured to receive a portion of the object 100, thereby permitting the object 100 to extend through the ram air turbine 200 completely or partially.

Figure 6:
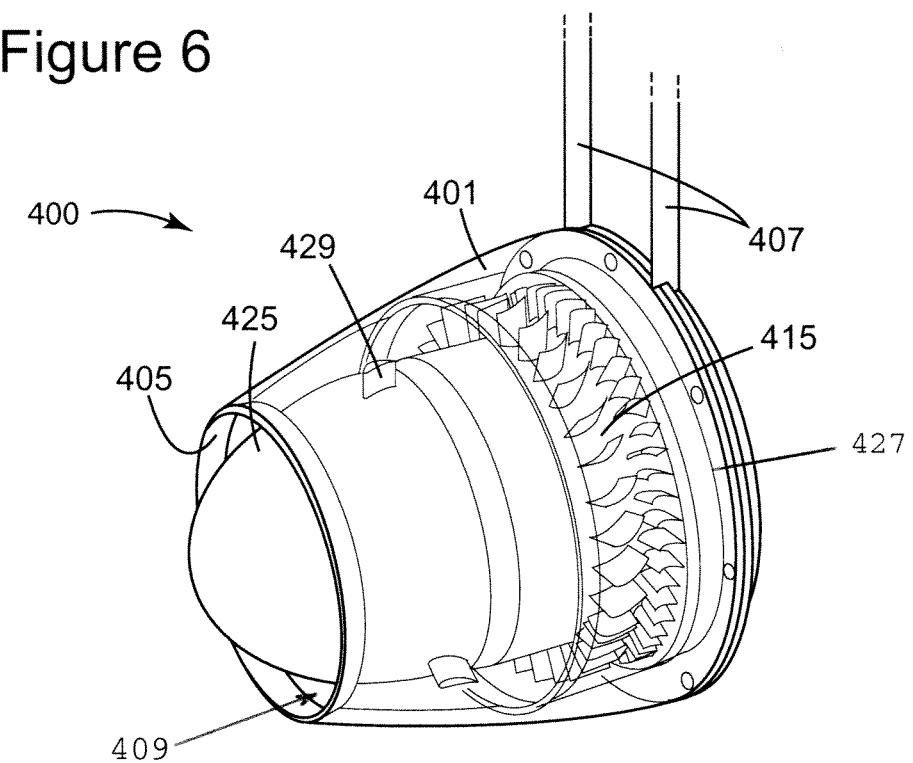
FIG. 6 is a perspective view of an alternative embodiment of a ram air turbine ("RAT").

For example, as illustratively shown in FIG. 6, a support member 407 may partially extend through a central cavity of the second member 207 of the ram air turbine 400.

As another example, as illustratively shown in FIGS. 2, 3 and 4, the central cavity 239 of the second member 207 is configured to receive the fuel hose 101, thereby permitting the fuel hose 101 to pass through the ram air turbine 200 completely (e.g., from end to end). The hollow cavity 239 also extends along, and parallels, a longitudinal central axis 107 of the object 100, and the fasteners 237 couple the second member 207 with the outer surface of the fuel hose 101. As another example, the central cavity 239 of the second member 207 is configured to receive one of a support member (407 in FIG. 6), an aircraft pod (not shown) or a piece of ordnance (not shown), thereby permitting the support member, aircraft pod, or ordnance to pass through the ram air turbine 200. The hollow cavity 239 also extends along, and parallels, a longitudinal central axis of the support member, aircraft pod, or ordnance. One or more fasteners 237 may couple the second member 207 of the ram air turbine 200 with the support member, aircraft pod, or ordnance.

The first member 202 has a curved portion 203 that terminates at a first end in a leading edge 205 and that terminates at an opposite second end in a flange 227. The leading edge 205 varies in thickness and is setback a predetermined distance 231 aft of the first end 219 of the second member 207. The portion of the inner surface 233 of the leading edge 205 may be angled (as shown in FIG. 3) to taper from the opening of the inlet 209 aft to an aft portion 235. From the aft portion 235 of the leading edge 205, the inner surface 233 curves outwardly away from the curved flow surface 225 of the second member 207 so that the inlet 209 expands. Accordingly, the inlet 209 is narrowest between the aft portion 235 of the inner surface 233 of the leading edge 235 and the flow surface 225 of the second member 207. This induces fluid acceleration at area 230 within the inlet 209. At airspeeds of approximately 0.3 Mach and higher, this fluid acceleration at area 230 results in flow choking, which reduces airflow through the inlet 209, thereby preventing over-speed conditions. At lower airspeeds, this fluid acceleration at area 230 does not result in flow choking and therefore does not reduce airflow entering the inlet 209. Referring to FIGS. 2 and 4, one or more struts 229 couple the first member 202 and the second member 207 together, and space the first member 202 and the second member 207 apart to form the inlet 209, which varies in thickness at various points 211, 213 and 216 (FIG. 4) to choke airflow through the inlet 209 to prevent overspeed of the turbine shaft 215. The first point 211 is at the inlet opening, between an inner surface of the leading edge 205 of the first member 202 and the flow surface 225 (FIG. 2) of the second member 207. The second point 213 is within the inlet 109, between the flow surface 225 and an aft portion of the inner surface of the leading edge 205 of the first member 202. The third point is further within the inlet 109, proximate the second end 221 of the second member 207, between the inner surface 233 of the first member 202 and the flow surface 225 of the second member 207.

Downstream of the leading edge 205 of the first member 202, first stage stators 214 and second stage stators 218 are coupled with a portion of the first member 202. The second stage stators 218 are spaced apart from and downstream of the first stage stators 214.

The second member 207 is spaced apart from and fixed relative to the first member 202. Additionally, a portion of the second member 207 supports the turbine shaft 215 so that the turbine shaft 215 can rotate freely around the exterior surface of the fuel hose 101. First stage rotor blades 212 and second stage rotor blades 217 are coupled with the turbine shaft 215. The first stage rotor blades 212 are positioned downstream of the first stage stators 214 and upstream of the second stage stators 218. The second stage rotor blades 217 are positioned downstream of the second stage stators 218.

Referring to FIGS. 1, 2, 3, and 4, in operation, the object 100, e.g., an aerial refueling apparatus 102 in this example, is equipped with an embodiment of the ram air turbine 200, which encircles and is coupled with an exterior portion of the object, e.g., an exterior surface of the fuel hose 101, in this case. The object 100 is deployed from a first aircraft, at low airspeeds, pursuant to standard refueling procedures. Once the ram air turbine 200 encounters the airflow, a mix of smooth air from the atmosphere and turbulent air, which flows along the exterior surface of the object 100, e.g., fuel hose 101, impacts the sloping first end 219 of the second member 207 and follows the curved flow surface 115 into the inlet 209. A portion of this mix of air also impacts the leading edge 105 of the first member 202 and follows the inner surface 233 of the first member 202 into the inlet 109. Thereafter, the mix of air encounters the compression area 230, which helps accelerate air flowing at low airspeeds and which helps choke air flowing at high airspeeds. Leaving the compression area 203, the air flows between and around the struts 229 and is routed by the first stage stators 214 to rotate the first stage rotors 212. This compresses the air and forces it through the second stage stators 218. Air exiting the second stage stators 218 rotates the second stage rotors 217 and then exits the rear of the ram air turbine 200. The rotational force of the air passing through the ram air turbine 200 combines with the lever arm(s) provided by the first stage rotors 212 and the second stage rotors 217 to rotate the turbine shaft 215, which turns around the exterior surface of the portion of the object 100 to which the ram air turbine 200 is coupled. Using known power generation means, such as magnets and coils, the rotational energy of the turbine shaft 215 is converted to electrical power, which is used to operate one or more components of the object 100 and/or the aircraft 300.

Figure 5:
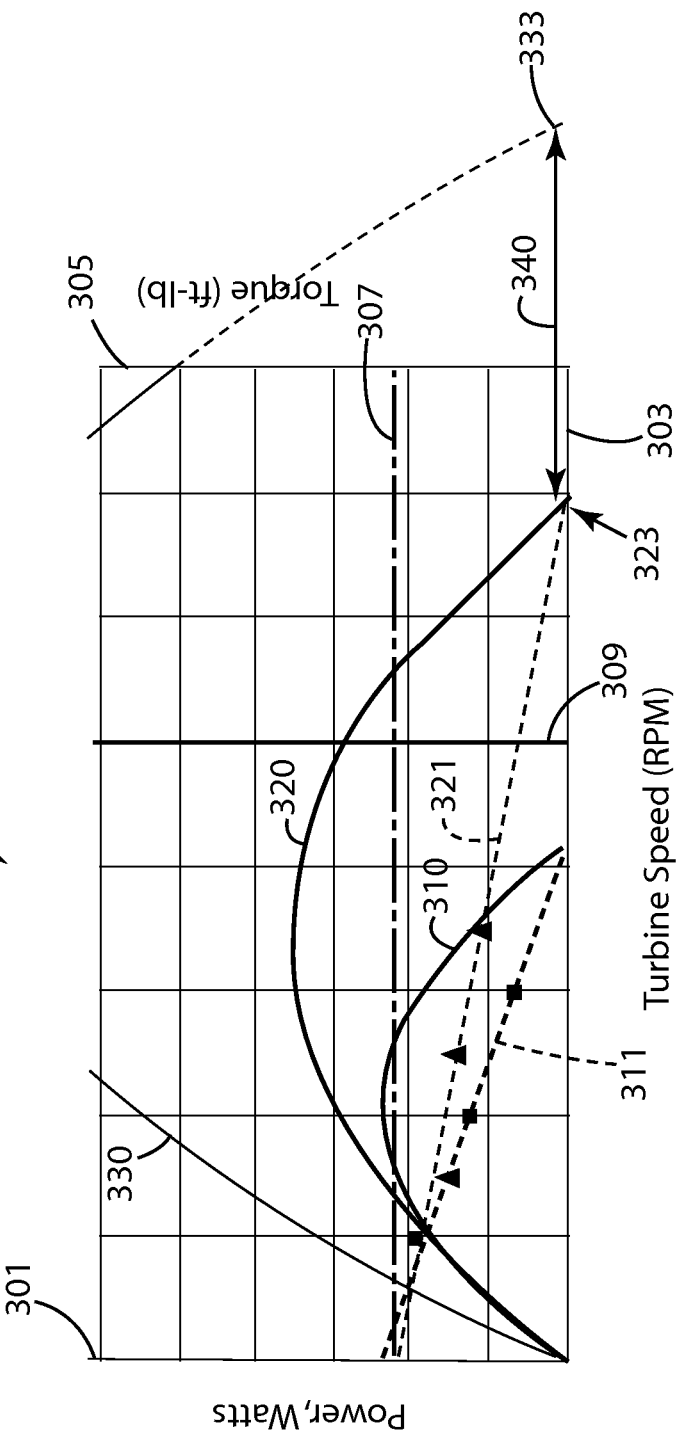
FIG. 5 is a graph illustrating a lowered terminal speed predicted to be achievable with one or more embodiments of the invention.

FIG. 5 is a graph 300 illustrating a lowered terminal speed 323 predicted to be achievable with one or more embodiments of the ram air turbine 200 of FIGS. 1, 2, 3 and 4. The x-axis of the graph 300 represents turbine speed (RPM) 303. The left y-axis of the graph 300 represents electrical power (Watts) 301. The right y-axis of the graph 300 represents torque (ft-lbs) 305. The horizontal dashed line represents a predetermined power threshold (or wattage) 307. The reference numeral 309 represents a predetermined turbine speed for normal flight operations at which power generation is optimized. This predetermined turbine speed 209 will vary depending on the intended use and/or application of the ram air turbine 200.

The smallest parabola represents a first case 310 indicating the minimum turbine speeds necessary for a typical ram air turbine, operating at low airspeeds, to achieve the predetermined power threshold 307. The dashed line under the smallest parabola indicates the torque 311 at various turbine speeds for this first case.

The middle parabola represents a second case 320 indicating the power levels that can be obtained, at high airspeeds, using an embodiment of the ram air turbine 200 and the inlet 209 (choked). This second case has a choked terminal speed 323, which is below an overspeed condition of the ram air turbine 200. The dashed line under the middle parabola indicates the torque 321 at various turbine speeds for this second case 320.

The largest parabola represents a third case 330, at higher airspeeds, which will cause an overspeed condition in a typical ram air turbine (unchoked). Such an overspeed condition is predicted to result in an un-choked terminal speed 333. Clearly, embodiments of the ram air turbine 200 and the inlet 209 afford a significant reduction 240 in over-speed.

FIG. 6 is a perspective view of an alternative embodiment of a ram air turbine 400 having a nose cone 425 that forms part of a second member (207 in FIG. 4). The ram air turbine 400 has a fairing 401 that is supported by one or more struts 429. A first member (202 in FIG. 4) has a leading edge 405. The space between the leading edge 405 and a portion of the nose cone 425 forms an inlet 409 having the fixed geometry previously described with respect to FIGS. 2, 3 and 4. This fixed geometry chokes airflow through the inlet 409 to prevent overspeed of the turbine shaft 415.

The alternative embodiment of the ram air turbine 400 of FIG. 6 can be configured to be coupled with a support member 407. In one embodiment, a first end of the support member 407 is coupled with the ram air turbine 400, and a second end of the support member 407 is coupled with an aircraft. In such an embodiment, the turbine shaft 415 may be positioned to rotate around a portion of the support member 407. Alternatively, the support member 407 is coupled with a portion, such as the flange 427, of the ram air turbine 400. In either case, the support member 407 may be movable between a first position and a second position. The first position may be an enclosed position within an aircraft in which no airflow from outside the aircraft passes through the inlet 409. The second position may be an operating position in which airflow from outside the aircraft passes through the inlet 409 so that electrical power is generated as the turbine shaft 415 rotates. This electrical power can be used during routine flight and/or in emergency situations to power one or more components of the object 100 (FIG. 1) and/or the aircraft 300 (FIG. 1).

On the other hand, the alternative embodiment of the ram air turbine 400 of FIG. 6 can also be configured to be coupled with a front end of an aircraft pod or a front end of a piece of ordnance.

Embodiments of the ram air turbine 200 can be made using known manufacturing techniques and materials. The scale of the ram air turbine 200, and the composition of the one or more materials comprising it, will vary depending on the application. For example, the fairing may consist of or comprise anodized aluminum, such as 7075-T7 Anodized Aluminum Forged Bar.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the scope of the following claims.

What is claimed is:

1. A ram air turbine, comprising:
    a turbine Shaft having no nose cone and configured to rotate about a portion of an object;

an inlet forward of the turbine shaft, the inlet having a fixed geometry that chokes airflow through the inlet to prevent overspeed of the turbine shaft;

a first member having a leading edge, the leading, edge having an inner surface and an aft portion, the first member supporting and/or coupled with an aerodynamically shaped fairing;

a second member having a curved flow surface extending from a first end along a curved portion to an opposite second end, which is within the fairing and the first member, the second member also having a central cavity configured to receive a portion of the object; and wherein a center portion of the first end of the second member is open, to permit the object to extend through the ram air turbine.

2. The ram air turbine of claim 1, wherein the object is a fuel hose.

3. The ram air turbine of claim 1, wherein the object is a fuel boom.

4. The ram air turbine of claim 1, wherein the object is an aircraft pod.

5. The ram air turbine of claim 1, wherein the object is a piece of ordnance.

6. A ram air turbine, comprising:

a turbine shaft, the turbine shaft configured to rotate about a portion of an object;

an inlet forward of the turbine shaft, the inlet having a fixed geometry that chokes airflow through the inlet to prevent overspeed of the turbine shaft, wherein the inlet has a first member and a second member, and a first end of the second member is closed to form a nose cone, wherein the first member supports and/or is coupled with an aerodynamically shaped fairing;

wherein the second member has a curved flow surface extending from a first end along a curve(portion to an opposite second end, which is within the fairing and the first member, the second member also having a central cavity configured to receive a portion of the object; and wherein a center portion of the first end of the second member is open, to permit the object to extend through the ram air turbine.

7. The ram air turbine of claim 6, wherein the object is a support member that can be coupled with an aircraft.

8. The ram air turbine of claim 6, wherein the object is an aircraft pod.

9. The ram air turbine of claim 6, wherein the object is a piece of ordnance.

10. An inlet for a ram air turbine having a turbine shaft positioned aft of the inlet, the inlet comprising:

a first member having a leading edge, the leading edge having an inner surface and an aft portion, wherein the first member supports and/or is coupled with an aerodynamically shaped fairing;

a second member having a curved flow surface extending from at first end along a curved portion to an opposite second end, which is within the fairing and the first member, the second member also having a central cavity configured to receive a portion of an object; and a strut coupling the first member and the second member together and spacing the first member and the second member apart to form the inlet, which varies in thickness to choke airflow through the inlet to prevent overspeed of the turbine shaft, wherein a center portion of the first end of the second. member is open, to permit the object to extend through the ram air turbine.

11. The ram air turbine of claim 10, wherein the object is a fuel hose.

12. The ram air turbine of claim 10, wherein the object is a fuel boom.

13. The ram air turbine of claim 10, wherein the object is a support member that can be coupled with an aircraft 14. The ram air turbine of claim 10, wherein the object is an aircraft pod.

15. The ram air turbine of claim 10, wherein the object is a piece of ordnance.

* * * * *

UNITED STATES PATENT AND TRADEMARK OFFICE
CERTIFICATE OF CORRECTION

PATENT NO. : 8,790,079 B2
APPLICATION NO. : 12/982941
DATED : July 29, 2014
INVENTOR(S) : Tersmette et al.

It is certified that error appears in the above-identified patent and that said Letters Patent is hereby corrected as shown below:

Claims

In Column 6, Line 66, in Claim 1, delete "Shaft" and insert -- shaft --, therefor.

In Column 7, Line 4, in Claim 1, delete "leading," and insert -- leading --, therefor.

In Column 7, Line 28, in Claim 6, delete "haying" and insert -- having --, therefor.

In Column 7, Line 37, in Claim 6, delete "curve(portion" and insert -- curved portion --, therefor.

In Column 8, Line 18, in Claim 10, delete "at first" and insert -- a first --, therefor.

In Column 8, Line 27, in Claim 10, delete "second." and insert -- second --, therefor.

Signed and Sealed this
Fifth Day of January, 2016

Michelle K. Lee
*Director of the United States Patent and Trademark Office*